US008400463B2

(12) United States Patent
Wang

(10) Patent No.: US 8,400,463 B2
(45) Date of Patent: Mar. 19, 2013

(54) DATA PROCESSING MODULE FOR GENERATING DITHERED DATA AND METHOD THEREOF

(75) Inventor: Shih-Chung Wang, Hsin-Chu (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1204 days.

(21) Appl. No.: 12/243,927

(22) Filed: Oct. 1, 2008

(65) Prior Publication Data

US 2009/0085898 A1 Apr. 2, 2009

(30) Foreign Application Priority Data

Oct. 2, 2007 (TW) ................................ 96136923 A

(51) Int. Cl.
*G09G 5/02* (2006.01)
*G06K 15/00* (2006.01)
*H04N 1/405* (2006.01)

(52) U.S. Cl. ........ 345/596; 345/597; 345/598; 345/599; 358/3.13; 358/3.14; 358/3.15; 358/3.16; 358/3.17

(58) Field of Classification Search ........................ None
See application file for complete search history.

(56) References Cited

U.S. PATENT DOCUMENTS

| | | | | |
|---|---|---|---|---|
| 6,339,615 | B1 * | 1/2002 | Kondo et al. | 375/240.14 |
| 7,738,000 | B2 * | 6/2010 | Furukawa et al. | 345/690 |
| 8,212,828 | B2 * | 7/2012 | Wells et al. | 345/530 |
| 2005/0185001 | A1 * | 8/2005 | Feng et al. | 345/597 |
| 2005/0248508 | A1 | 11/2005 | Seong | |
| 2006/0066643 | A1 | 3/2006 | Arai | |
| 2006/0087696 | A1 | 4/2006 | Lee | |
| 2007/0159469 | A1 | 7/2007 | Thebault | |

FOREIGN PATENT DOCUMENTS

| | | | |
|---|---|---|---|
| CN | 1763825 | A | 4/2006 |
| CN | 1841477 | A | 10/2006 |

* cited by examiner

*Primary Examiner* — Kee M Tung
*Assistant Examiner* — Haixia Du
(74) *Attorney, Agent, or Firm* — Winston Hsu; Scott Margo

(57) ABSTRACT

A data processing module for generating dithered data includes a data transforming unit and a dithering unit, wherein the data transforming unit is utilized to transform input data into transformed data containing predetermined data, and the dithering unit is utilized to perform a dithering process on the transformed data to generate the dithered data. By making the display picture of the dithered data contain a fixed pattern corresponding to the predetermined data, the influence on the display picture caused by noise existing in the input data can be efficiently reduced.

4 Claims, 4 Drawing Sheets

DATA PROCESSING MODULE FOR GENERATING DITHERED DATA AND METHOD THEREOF

BACKGROUND OF THE INVENTION

1. Field of the Invention

The present invention provides a dithering technique, and more particularly, a data processing module for generating dithered data, and a processing method thereof.

2. Description of the Prior Art

In a liquid crystal display (LCD), a signal controller is utilized to receive R/G/B pixel data, and generate corresponding control signals to control a driving IC. The driving IC then drives the display panel of the LCD according to the control signals in order to form a display picture. Therefore, the bit number that the driving IC can handle is generally equal to the bit number of the pixel data received by the signal controller.

In order to lower production costs, however, LCDs are designed to combine the conventional displaying technique with a dithering technique, thereby allowing a driving IC to process pixel data having a bit number higher than the ability of the driving IC. For example, when the dithering technique is to rotate 4 frames in a rotation cycle, the driving IC can equivalently increase its signal processing ability by 2 bits. The LCD can then utilize a driving IC having 6-bit signal processing ability to process 8-bit pixel data.

The dithering technique has brought advantages such as reduced production cost of LCDs; however, it induces noise on the display picture. For example, after dithering, the scaling noise generated during transforming the analog input signal into the digital pixel data will be enlarged to a degree that the human eye can detect. The overall display quality is therefore reduced.

SUMMARY OF THE INVENTION

One objective of the present invention is therefore to provide a data processing module for generating dithered data, and a processing method thereof. The data processing module can diminish the influence on the display quality caused by the noise on the display picture due to scaling errors or other reasons to solve the above-mentioned problems.

According to one exemplary embodiment of the present invention, a data processing module for generating dithered data is disclosed. The data processing module includes a data transforming unit and a dithering unit, wherein the data transforming unit is utilized to transform input data into transformed data according to predetermined data, the predetermined data corresponds to a predetermined pattern, and the dithering unit is utilized to dither the transformed data in order to generate the dithered data.

According to another exemplary embodiment of the present invention, a data processing module for generating dithered data is disclosed. The data processing module includes a predetermined pattern data generating unit, a dithering module, and a computing unit. The predetermined pattern data generating unit generates predetermined data corresponding to predetermined pattern, and the dithering module coupled to the predetermined pattern data generating unit dithers the predetermined data to generate dithered predetermined data. The dithering unit further dithers input data to generate dithered input data. The computing unit coupled to the dithering module then generates the dithered data according to the dithered predetermined data and the dithered input data.

According to another exemplary embodiment of the present invention, a method of generating dithered data is disclosed. The method includes transforming input data into transformed data containing predetermined data corresponding to a predetermined pattern, and dithering the transformed data to generate the dithered data.

According to another exemplary embodiment of the present invention, a method of generating dithered data is disclosed. The method includes generating predetermined data, dithering the predetermined data to generate dithered predetermined data, dithering input data to generate dithered input data, and generating the dithered data according to the dithered predetermined data and the dithered input data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
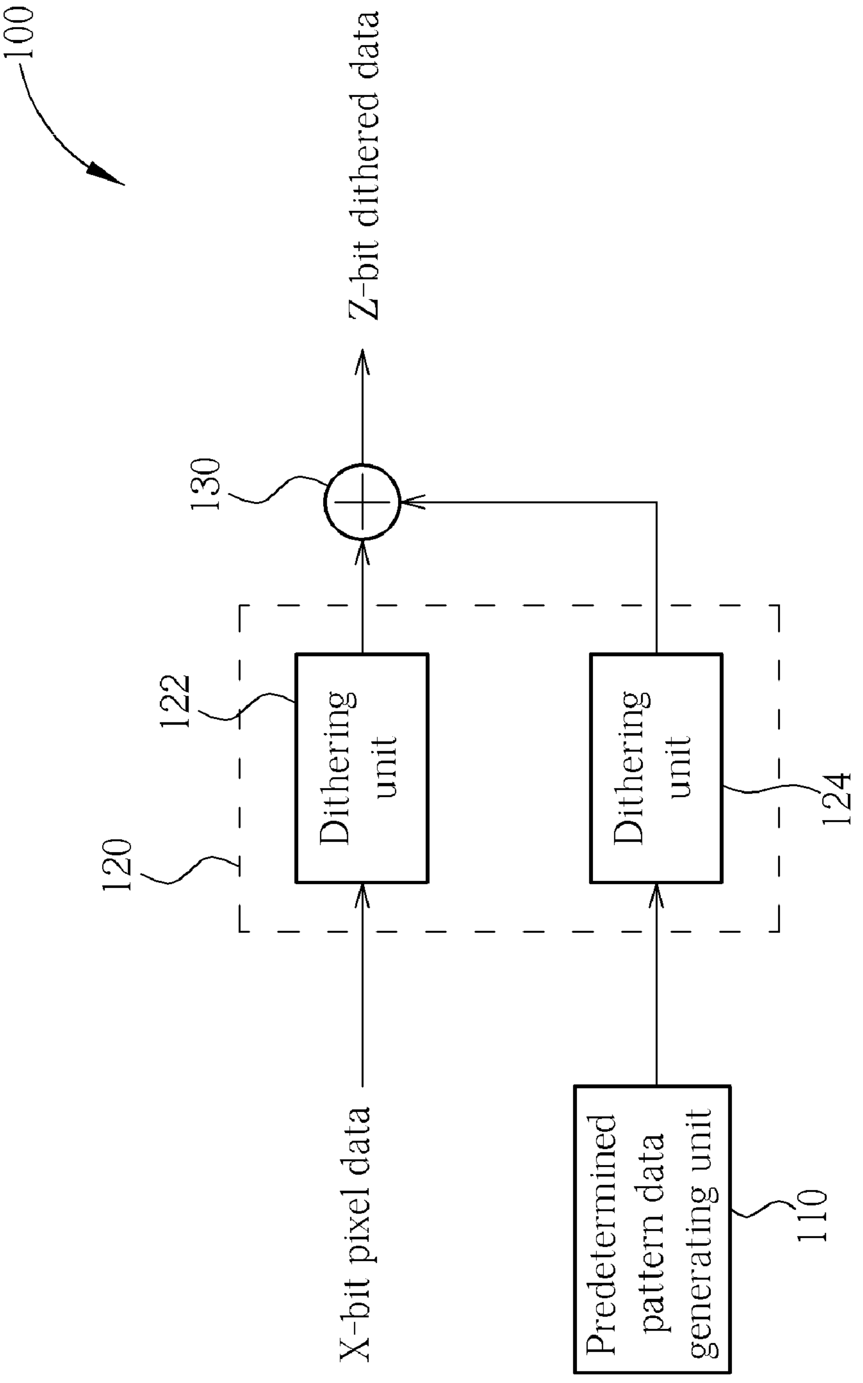
FIG. 1 is a block diagram of a data processing module according to one exemplary embodiment of the present invention.

Please refer to FIG. 1, which is a block diagram of a data processing module 100 according to one exemplary embodiment of the present invention. A special function of the data processing module 100 is to add a fixed pattern to the display picture of the X-bit input pixel data, i.e. to add specific light point(s) or dark point(s) to the display picture of the X-bit input pixel data. This is because, in general, the noise generated from dithering the scaling error or from other sources will be distributed uniformly on the display picture; therefore, when the weighting of the fixed pattern generated by the data processing module 100 is larger than the weighting of the noise, the human eye will be easily attracted by the light points or dark points of the fixed pattern on the screen and thereby ignore the noise influence.

Therefore, in this embodiment, the data processing module 100 includes a predetermined pattern data generating unit 110, a dithering module 120, and a computing unit 130. The predetermined pattern data generating unit 110 is utilized to generate predetermined data corresponding to a predetermined pattern. The dithering module 120 includes dithering units 122 and 124, wherein the dithering unit 122 is utilized to dither the X-bit input pixel data to generate dithered pixel data, while the dithering unit 124 is utilized to dither the predetermined data generated by the predetermined pattern data generating unit 110 in order to generate dithered predetermined data. The computing unit 130 then generates the Z-bit dithered data according to the dithered predetermined data and the dithered pixel data.

In one embodiment, the computing unit 130 simply adds the dithered predetermined data to the dithered pixel data to generate the Z-bit dithered data. In this way, light points corresponding to the predetermined pattern will be shown on the display picture of the Z-bit dithered data. The computing unit 130 can be implemented by an adder. In another embodiment, the computing unit 130 simply subtracts the dithered predetermined data from the dithered pixel data to generate the Z-bit dithered data. Dark points corresponding to the predetermined pattern are then shown on the display picture of the Z-bit dithered data. In this embodiment, the computing unit 130 can be implemented by a subtracter.

As can be seen, the Z-bit dithered data is substantially constituted of the dithered predetermined data and the dithered pixel data. The displaying result of the Z-bit dithered data on the LCD panel is therefore substantially equivalent to the combination of the display picture of the dithered pixel data and the dithered predetermined pattern. When the predetermined data provided by the predetermined pattern data generating unit 110 is fixed, the predetermined pattern output by the dithering unit 124 is always fixed. As a result, an additional fixed pattern is added to the display picture of the X-bit input pixel data by the data processing module 100, and the influence on the display quality caused by the noise is thereby reduced.

Considering that the fixed pattern cannot be overly obvious as to affect the presentation of the X-bit pixel data, the weighting of the light points or the dark points in the fixed pattern needs to be controlled in an acceptable region. In one embodiment, the length of the predetermined data corresponding to the positions of the light points or the dark points in the fixed pattern is less than or equal to 2 bits. Therefore, in the predetermined data, the data corresponding to the positions of the light points or the dark points in the fixed pattern can be "1", "01", "10" or "11" (i.e. the nonzero values), while the other data in the predetermined data is "0". In one embodiment, the computing unit 130 appends the dithered predetermined data to the least significant bit(s) of the dithered pixel data.

Figure 2:
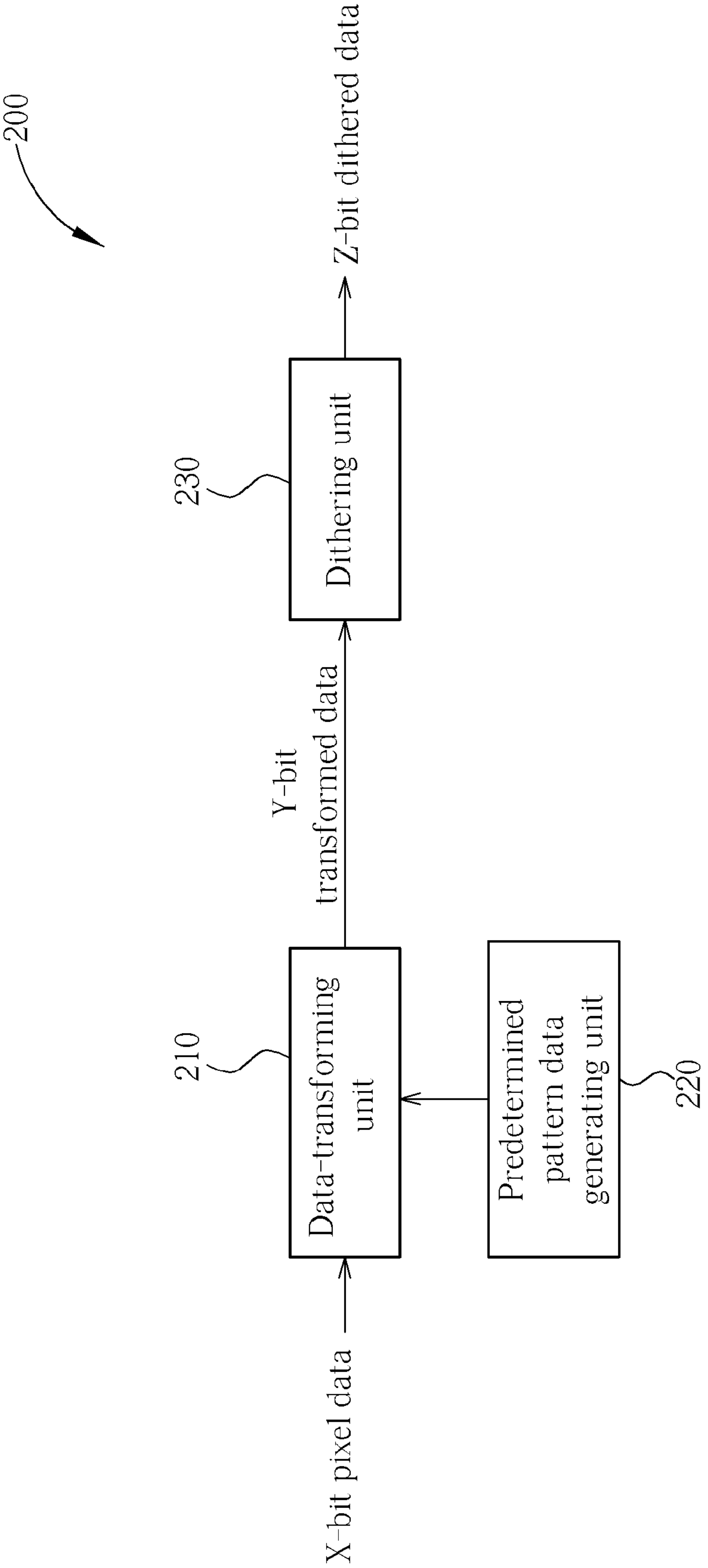
FIG. 2 is a block diagram of a data processing module according to another exemplary embodiment of the present invention.

FIG. 2 shows a block diagram of a data processing module 200 according to another exemplary embodiment of the present invention. As shown in FIG. 2, the data processing module 200 includes a data transforming unit 210, a predetermined pattern data generating unit 220 coupled to the data transforming unit 210, and a dithering unit 230 coupled to the data transforming unit 210. The predetermined pattern data generating unit 220 is similar to the above-mentioned predetermined pattern data generating unit 110, and is utilized to generate predetermined data corresponding to a predetermined pattern. The data transforming unit 210 transforms X-bit input pixel data into Y-bit transformed data containing the predetermined data corresponding to the predetermined pattern. The dithering unit 230 dithers the Y-bit transformed data to generate Z-bit dithered data.

In one embodiment, the data transforming unit 210 first appends the predetermined data to the least significant bits of the X-bit pixel data, and generates the Y-bit transformed data. The transformation can be implemented according to a mapping table, which maps the X-bit pixel data to the Y-bit transformed data. In another embodiment, the data transforming unit 210 first transforms the X-bit pixel data into Y-bit mapping data, and appends the predetermined data to the least significant bits of the Y-bit mapping data to generate the Y-bit transformed data.

The displaying result of the Z-bit dithered data is therefore substantially equivalent to the display picture of the X-bit pixel data added by the fixed pattern corresponding to the predetermined data.

Similarly, considering that the fixed pattern cannot be overly obvious as to affect the presentation of the X-bit pixel data, the length of the predetermined data corresponding to the positions of the light points or the dark points in the fixed pattern is less than 2 bits in this embodiment. Moreover, since the ability of the dithering unit 230 utilized in a LCD nowadays is usually limited (the maximum length of the transformed data that the dithering unit 230 can generally handle is 10 bits), the selection of the predetermined data should be related to the ability of the dithering unit 230. In one embodiment, when the pixel data is 8 bits, the dithered data is 6 bits (i.e. X=8, and Z=6), the dithering unit 230 rotates 4 frames in a rotation cycle when performing the dithering process, and the length of the predetermined data can be 1 bit or 2 bits. That is, the data in the predetermined data corresponding to the positions of the light points or the dark points in the fixed pattern can be "1", "01", "10" or "11" (i.e. the nonzero values), while the other data in the predetermined data is "0". When the length of the predetermined data is set to be 1 bit, the data-transforming unit 210 transforms the 8-bit pixel data into 9-bit transformed data, and adds the predetermined data to the least significant bit of the transformed data, or subtracts the predetermined data from the least significant bit of the transformed data. The dithering unit 230 then dithers the 9-bit transformed data to generate the 6-bit dithered data. On the other hand, when the length of the predetermined data is chosen to be 2 bits, the data transforming unit 210 transforms the 8-bit pixel data into 10-bit transforming data, and adds the predetermined data to the least two significant bits of the transformed data, or subtracts the predetermined data from the least two significant bits of the transformed data. The dithering unit 230 then dithers the 10-bit transformed data to generate the 6-bit dithered data.

Figure 3:
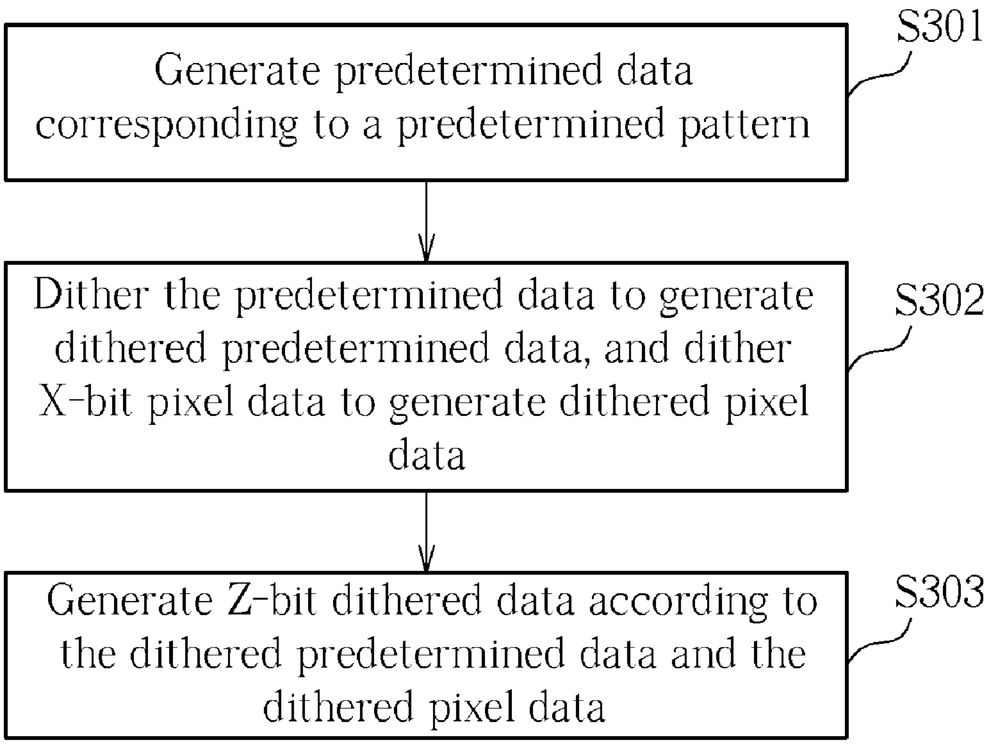
FIG. 3 shows a flowchart of a dithering data generating method according to another exemplary embodiment of the present invention.

FIG. 3 shows a flowchart of a dithering data generating method according to another exemplary embodiment of the present invention. The dithering data generating method in this embodiment is related to the data processing module 100 shown in FIG. 1, and comprises steps described hereinafter. In step S301, predetermined data is generated. The predetermined data corresponds to a predetermined pattern. In step S302, dithering the predetermined data to generate dithered predetermined data and dithering X-bit pixel data to generate dithered pixel data are performed. In step S303, generating Z-bit dithered data according to the dithered predetermined data and the dithered pixel data is performed.

In one embodiment, the Z-bit dithered data is generated by simply adding the dithered predetermined data to the dithered pixel data. In this way, light points corresponding to the predetermined pattern will be shown on the display picture of the Z-bit dithered data. In another embodiment, the Z-bit dithered data is generated by subtracting the dithered predetermined data from the dithered pixel data. Dark points corresponding to the predetermined pattern are then shown on the display picture of the Z-bit dithered data.

Figure 4:
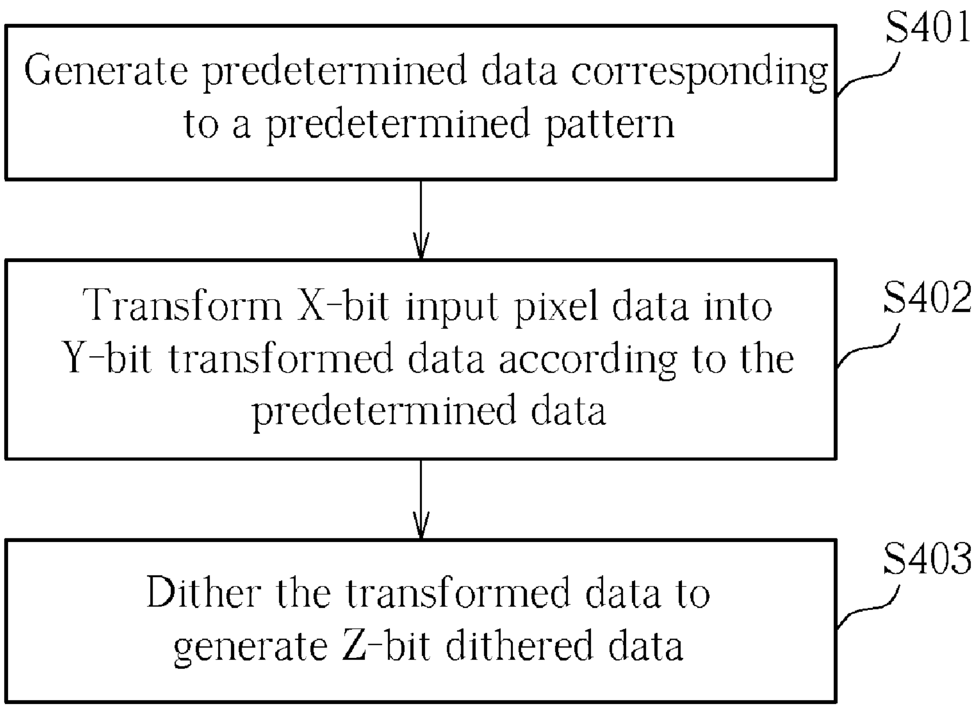
FIG. 4 shows a flowchart of a dithering data generating method according to another exemplary embodiment of the present invention.

FIG. 4 shows a flowchart of a dithering data generating method according to another exemplary embodiment of the present invention. The dithering data generating method in this embodiment is related to the data processing module 200 shown in FIG. 2, and comprises steps described hereinafter. In step S401, predetermined data is generated. The predetermined data corresponds to a predetermined pattern. In step S402, transforming X-bit input pixel data into Y-bit transformed data according to the predetermined data is performed. In step S403, dithering the transformed data to generate Z-bit dithered data is performed.

In one embodiment, the Y-bit transformed data is generated by first appending the predetermined data to the least significant bits of the X-bit pixel data. The transformation can be implemented according to a mapping table, which maps the X-bit pixel data to the Y-bit transformed data. In another embodiment, the X-bit pixel data is first transformed into Y-bit mapping data, and then the predetermined data is appended to the least significant bits of the Y-bit mapping data to generate the Y-bit transformed data.

Please note that, in the above embodiments, the data processing modules 100 and 200 and the related methods do not limit the dithering techniques adopted by the dithering units and the display technique adopted by the LCDs. No matter what kind of decoding mechanism is utilized in the LCDs, the data processing modules 100 and 200 and the related methods can always be utilized to reduce the noise influence on the display quality by adding a fixed pattern to the display picture.

Those skilled in the art will readily observe that numerous modifications and alterations of the device and method may be made while retaining the teachings of the invention.

What is claimed is:

1. A method of generating dithered data, comprising:

generating predetermined data corresponding to a predetermined pattern;

dithering the predetermined data to generate dithered predetermined data;

dithering input data to generate dithered input data; and generating the dithered data according to the dithered predetermined data and the dithered input data;

wherein the step of generating the dithered data comprises using an adder or a subtracter to generate the dithered data.

2. The method of claim 1, wherein the step of generating the dithered data comprises adding the dithered predetermined data to the dithered input data.

3. The method of claim 1, wherein the step of generating the dithered data comprises subtracting the dithered predetermined data from the dithered input data.

4. The method of claim 1, wherein the input data is X-bit data and the dithered data is Z-bit data, X and Z are positive integers, and Z is smaller than X.

* * * * *